(12) United States Patent
Lei et al.

(10) Patent No.: US 9,791,864 B2
(45) Date of Patent: Oct. 17, 2017

(54) SYSTEMS AND METHODS FOR DRIVING RISK INDEX ESTIMATION

(71) Applicant: Ford Global Technologies, LLC, Dearborn, MI (US)

(72) Inventors: Oliver Lei, Windsor (CA); Allen R. Murray, Lake Orion, MI (US); David Joseph Orris, Allen Park, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/066,881

(22) Filed: Mar. 10, 2016

(65) Prior Publication Data

US 2017/0261990 A1   Sep. 14, 2017

(51) Int. Cl.
*G06F 7/00*   (2006.01)
*G05D 1/02*   (2006.01)

(52) U.S. Cl.
CPC .................. *G05D 1/0214* (2013.01)

(58) Field of Classification Search
CPC .... G07C 5/0808; G07C 5/02; B60C 23/0481; B60C 23/0488; G01P 3/00; G05D 1/0214
USPC .................................................. 701/29.7, 36
See application file for complete search history.

(56) References Cited

U.S. PATENT DOCUMENTS

| | | | |
|---|---|---|---|
| 8,160,811 B2 | 4/2012 | Prokhorov | |
| 8,705,463 B2 * | 4/2014 | Yu | H04L 5/0048 370/329 |
| 8,767,695 B2 * | 7/2014 | Sheriff | H04W 36/30 370/328 |
| 8,964,664 B2 * | 2/2015 | Hu | H04W 72/0473 370/329 |
| 9,076,045 B2 * | 7/2015 | Atsmon | G01C 21/3602 |
| 9,264,124 B2 * | 2/2016 | Wu | H04B 7/10 |
| 2007/0188348 A1 | 8/2007 | Bauer | |
| 2015/0112730 A1 | 4/2015 | Binion et al. | |
| 2015/0325121 A1 | 11/2015 | Konigsberg et al. | |
| 2016/0189068 A1 * | 6/2016 | Amano | G06Q 10/0635 705/7.28 |

FOREIGN PATENT DOCUMENTS

| | | |
|---|---|---|
| CN | 204189211 U | 3/2015 |
| CN | 104867356 A | 8/2015 |

OTHER PUBLICATIONS

Richier et al., Rollover prevention of All-Terrain Vehicle during aggressive driving using multi-model observer. Application to ATVs in off-road context., 2013, IEEE, p. 1-6.*

(Continued)

*Primary Examiner* — McDieunel Marc
(74) *Attorney, Agent, or Firm* — James P. Muraff; Neal, Gerber & Eisenberg LLP

(57) ABSTRACT

A vehicle implements driving risk estimation. The vehicle includes a processor and a program stored in memory. The vehicle calculates a first risk estimation based on first vehicle dynamics data, and second vehicle dynamics data and a second risk estimation received from a second proximate vehicle. The vehicle also, in response to the first risk estimation satisfying a risk threshold, determines a risk reduction action, and automatically instructs a vehicle control unit to implement the risk reduction action.

20 Claims, 4 Drawing Sheets

(56) References Cited

OTHER PUBLICATIONS

Neto et al., Real-Time Collision Risk Estimation based on Pearson's Correlation Coefficient, 2013, IEEE, p. 40-45.*
Maeyama et al., Outdoor navigation using natural landmarks by teaching-playback scheme, 1997, IEEE, p. V-17 to V-18.*
Christian Ress et al., ADASIS Protocol for Advanced In-Vehicle Applications, ADASIS Forum.
Rita: Intelligent Transportation Systems Joint Program Office, Core System Requirements Specification (SyRS), www.its.dot.gov/index.htm, Jun. 13, 2011, Revision A, Lockheed Martin, United States of America.

* cited by examiner

SYSTEMS AND METHODS FOR DRIVING RISK INDEX ESTIMATION

TECHNICAL FIELD

The present disclosure generally relates to vehicle-to-vehicle communication, more specifically, systems and methods for driving risk index estimation.

BACKGROUND

In the United States, the Dedicated Short Range Communication (DSRC) protocol is being developed as a part of the Intelligent Transportation System. The DSRC protocol will enable different forms of communications, such as vehicle-to-vehicle (V2V) and vehicle-to-infrastructure (V2I) (collectively V2X). The aim of deploying the DSRC protocol is to reduce fatalities, injuries, property destruction, time lost in traffic, fuel consumption, exhaust gas exposure, among others. Increasingly, vehicles are being equipped to use the DSRC protocol.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Exemplary embodiments provide systems and methods for driving risk estimation. A disclosed example vehicle calculates a first risk estimation based on first vehicle dynamics data, and second vehicle dynamics data and a second risk estimation received from a second proximate vehicle. The example vehicle also, in response to the first risk estimation satisfying a risk threshold, determines a risk reduction action, and automatically instructs a vehicle control unit to implement the risk reduction action.

An example disclosed method includes calculating a first risk estimation based on (i) first vehicle dynamics data from a first vehicle, and (ii) a second vehicle dynamics data and a second risk estimation received from a second vehicle proximate the first vehicle. The example method also includes, in response to the first risk estimation satisfying a risk threshold, determining an action to reduce the first risk estimation and automatically instructing the first vehicle to implement the action.

An example computer readable medium includes instructions that, when executed, cause a vehicle to calculate a first risk estimation based on (i) first vehicle dynamics data from a first vehicle, and (ii) a second vehicle dynamics data and a second risk estimation received from a second vehicle proximate the first vehicle. The example computer readable medium also includes instructions that, when executed, cause a vehicle to, in response to the first risk estimation satisfying a risk threshold, determine an action to reduce the first risk estimation of the first vehicle, and automatically implement the action, via an electronic control unit, to the first vehicle.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
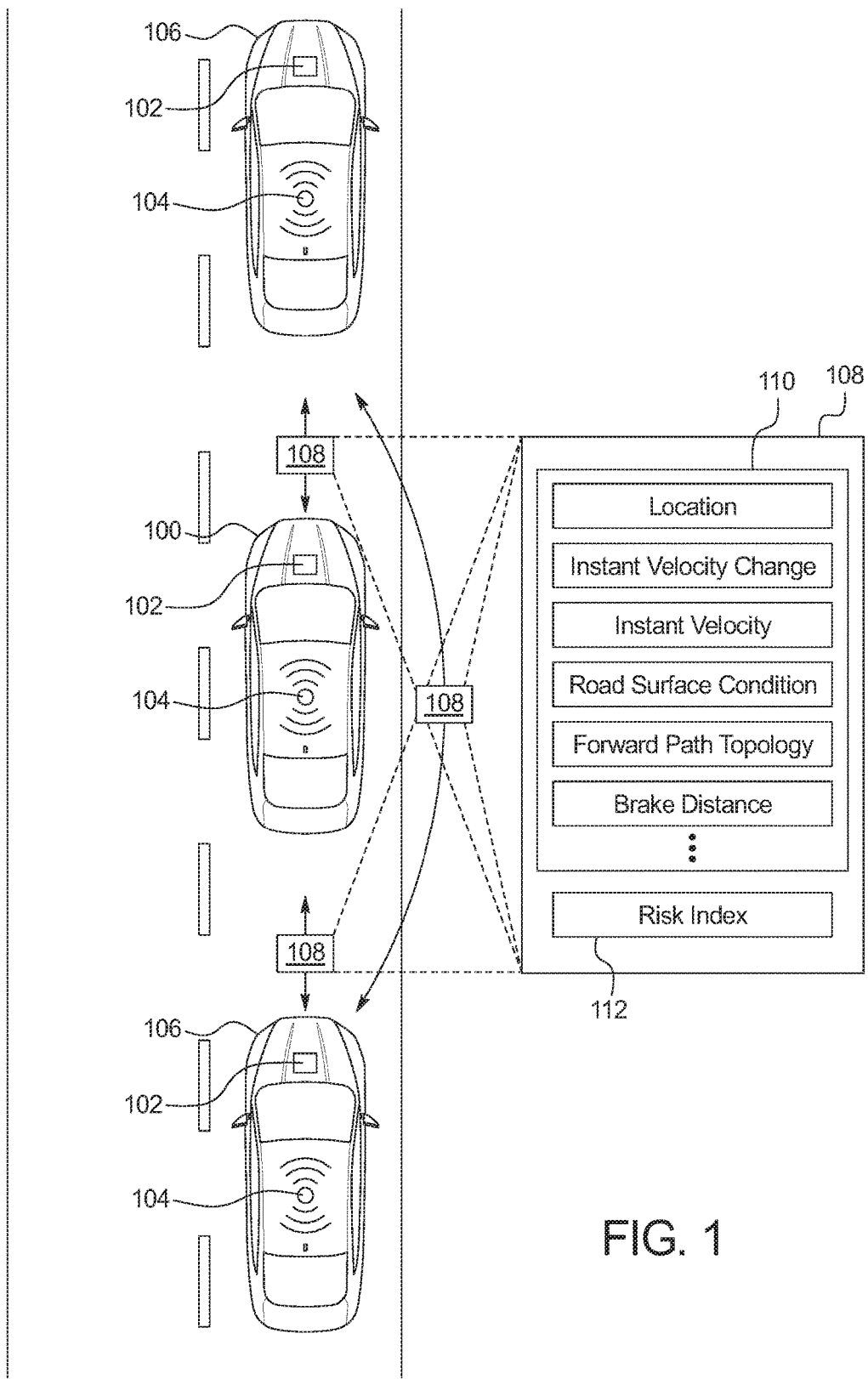
FIG. 1 illustrates vehicles estimating risk indices in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Vehicles (such as, cars, trucks, motorcycles, vans, sport utility vehicles, semi-trailer trucks, etc.) are increasingly being manufactured with systems that facilitate vehicle-to-vehicle (V2V) communication, such as direct short range communication (DSRC). Autonomous and semi-autonomous vehicles take actions (such as, braking, steering, speed control, etc.) without direct input from a driver. As used herein, a semi-autonomous vehicle is a vehicle with systems that may be activated by a driver to assist certain driving tasks, such as adaptive cruise control and/or parking assist. As disclosed in more detail below, the vehicles of the present disclosure include a risk index calculator. The risk index calculator collects vehicle dynamics data from the vehicle and receives risk data from one or more other vehicles within range of the vehicle via DSRC to calculate a risk index for the. The risk index is used to supply recommendations to the driver and/or automatically perform actions to reduce the risk. For example, if the risk index calculator estimates a medium level risk index, the vehicle may recommend that the driver slow down and/or automatically increase the gap distance with the vehicle in front.

FIG. 1 illustrates a vehicle 100 estimating risk indices in accordance with the teachings of this disclosure. In the illustrated example, the vehicle 100 includes a risk index calculator 102 and a DSRC module 104. The vehicle 100 may be a standard gasoline powered vehicle, a hybrid vehicle, an electric vehicle, a fuel cell vehicle, or any other mobility implement type of vehicle. The vehicle 100 may be non-autonomous, semi-autonomous or fully autonomous. The vehicle 100 includes parts related to mobility, such as a powertrain with an engine, a transmission, a suspension, a driveshaft, and/or wheels, etc.

Nearby vehicles 106 broadcast, via their DSRC modules 104, risk data 108. The risk index calculator 102 use the risk data 108 to estimate the risk index for the vehicle 100. As used herein, nearby vehicles 106 are vehicles within range of communicating via DSRC (such as, 300 meters (984 feet)). The vehicles 100 (a) generates recommendations for a driver to reduce the estimated risk index and/or (b) automatically (e.g., without driver intervention) takes an action to reduce the estimated risk index. The vehicle 100 is any type of mobility implement (e.g., cars, trucks, vans, sports utility vehicles, bicycles, mopeds, rickshaws, etc.).

In the illustrated example, the risk data 108 includes vehicle dynamics data 110 and a risk index 112. The vehicle 100 and the nearby vehicles 106 receive vehicle dynamics data from sensors and/or the electronic control units (ECUs) on the respective vehicle 100 and 106. As discussed in more detail below in connection with FIG. 3, the example vehicle dynamics data 110 includes a location and a direction of travel of the vehicle 100 and 106, a velocity of the vehicle 100 and 106, a velocity change (e.g. the change in velocity since the last risk data 108), a road surface condition, a forward path topology, and/or an estimated brake distance, etc. The risk index 112 is the risk index estimated by the risk index calculator 102 of the vehicle 100 and 106 that broadcast the risk data 108.

From time to time (e.g., periodically, aperiodically, etc.), the vehicle 100 estimates the risk index 112. In some examples, the vehicle 100 estimates the risk index 112 at intervals between ten millisecond and five hundred millisecond. For example, the vehicle 100 may estimate the risk index 112 every one hundred milliseconds. The risk index 112 represents the urgency at which corrective and/or preventative action should be taken to avoid road hazards. The risk index calculator 102 of the vehicle 100 obtains the vehicle dynamics data 110 of the vehicle 100. As discussed in more detail below in connection with FIG. 3, the risk index calculator 102 estimates the risk index 112 based on (a) the vehicle dynamics data 110 of the vehicle 100 (b) the risk data 108 received from other nearby vehicle(s) 106, (c) weather data and/or (d) location and heading of the nearby vehicles 106. For example, the vehicle dynamics data 110 of the vehicle 100 may indicate that the road is slippery, the risk data 108 from a first nearby vehicle 106 in the same lane as the vehicle 100 may indicate that the first nearby vehicle 106 is detecting a slippery road and is rapidly decelerating, and the risk data 108 from a second nearby vehicle 106 traveling in the opposite direction may indicate that the second nearby vehicle 106 is proceeding ten miles below the speed limit. In such an example, the risk data 108 from the first nearby vehicle 106 may be weighted heavier in the estimation of the risk index 112 than the second nearby vehicle 106. After calculating the risk index 112, the vehicle 100 broadcasts, via the DSRC module 104, the risk data 108 including the risk index 112 and the vehicle dynamics data 110 to be received by the nearby vehicles 106.

The risk index calculator 102 classifies the risk index 112 into categories. In some examples, the risk index calculator 102 classifies the risk index 112 into a high risk category, a medium risk category, and a low risk category. The vehicle 100 provides an audio and/or visual indication of the risk index 112 and/or the risk category. For example, the risk index calculator 102 may cause a voice to say, "Driving risk elevated to medium." As another example, the risk index calculator 102 may cause a color associated with the risk category (such as red for high risk, yellow for medium risk, green for low risk, etc.) and/or a numerical value of the risk index 112 to be displayed on a dashboard and/or a center console display. Depending on the risk category, the risk index calculator 102 audibly and/or visually communicates recommendations to occupants of the vehicle 100. In some examples, the risk index calculator 102 provides recommendations when the risk index calculator 102 classifies the risk index 112 into the medium risk category. For example, risk index calculator 102 may recommend that the driver slow the vehicle 100 when the nearby vehicle 106 detects a tight curve in its forward path topology. In some examples in which the vehicle is autonomous or semi-autonomous, the risk index calculator 102 takes automatic corrective action when the risk index 112 is categorized in the medium or high risk category. For example, the risk index calculator 102 may instruct the anti-lock brake ECU to begin braking or the drive train ECU to deploy four-wheel drive.

Figure 2:
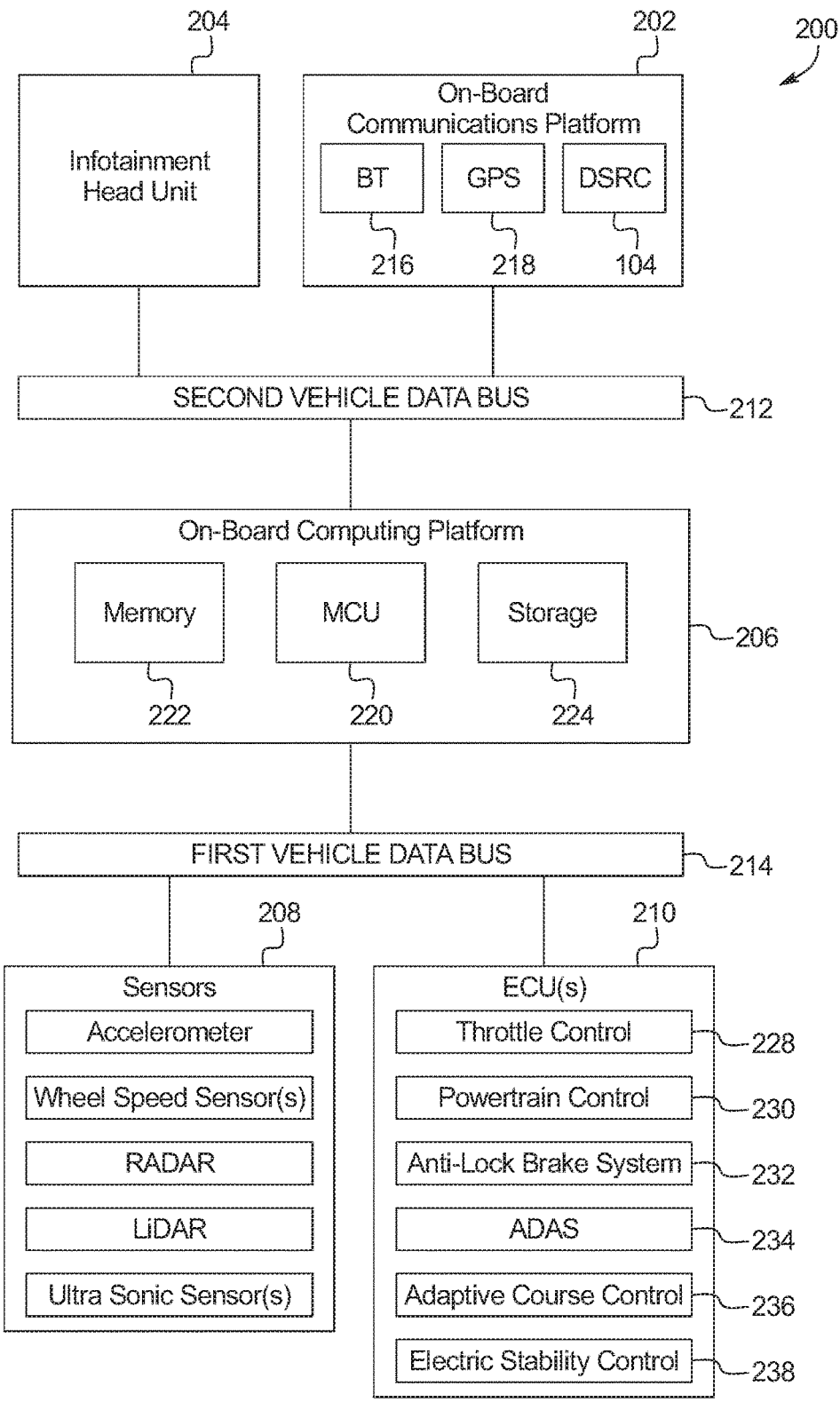
FIG. 2 is a block diagram illustrating electronic components of the vehicles of FIG. 1.

FIG. 2 is a block diagram illustrating electronic components 200 of the vehicles 100 and 106 of FIG. 1. The electronic components 200 include an example on-board communications platform 202, an example infotainment head unit 204, an on-board computing platform 206, example sensors 208, example ECUs 210, a second vehicle data bus 212, and first vehicle data bus 214.

The on-board communications platform 202 includes wired or wireless network interfaces to enable communication with external networks. The on-board communications platform 202 also includes hardware (e.g., processors, memory, storage, antenna, etc.) and software to control the wired or wireless network interfaces. In the illustrated example, the on-board communications platform 202 includes a Bluetooth® controller 216, a GPS receiver 218, and the DSRC module 104. The on-board communications platform 202 may also include controllers for other standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); Near Field Communication (NFC); local area wireless network (including IEEE 802.11 a/b/g/n/ac or others), and Wireless Gigabit (IEEE 802.11ad), etc.). Further, the external network(s) may be a public network, such as the Internet; a private network, such as an intranet; or combinations thereof, and may utilize a variety of networking protocols now available or later developed including, but not limited to, TCP/IP-based networking protocols. The on-board communications platform 202 may also include a wired or wireless interface to enable direct communication with an electronic device (such as, a smart phone, a tablet computer, a laptop, etc.).

The example DSRC modules 104 include antenna(s), radio(s) and software to receive DSRC messages from the nearby vehicles 106 and/or infrastructure (such as, traffic lights, toll booths, etc.) and broadcast DSRC messages to the nearby vehicles 106 and/or the infrastructure. DSRC is a wireless communication protocol or system, mainly meant for transportation, operating in a 5.9 GHz spectrum band. More information on the DSRC network and how the network may communicate with vehicle hardware and software is available in the U.S. Department of Transportation's Core June 2011 System Requirements Specification (SyRS) report (available at http://www.its.dot.gov/meetings/pdf/ CoreSystem_SE_SyRS_RevA%20(2011-06-13).pdf), which is hereby incorporated by reference in its entirety along with all of the documents referenced on pages 11 to 14 of the SyRS report. DSRC systems may be installed on vehicles and along roadsides on infrastructure. DSRC systems incorporating infrastructure information is known as a "roadside" system. DSRC may be combined with other technologies, such as Global Position System (GPS), Visual Light Communications (VLC), Cellular Communications, and short range radar, facilitating the vehicles communicating their position, speed, heading, relative position to other objects and to exchange information with other vehicles or external computer systems. DSRC systems can be integrated with other systems such as mobile phones.

Currently, the DSRC network is identified under the DSRC abbreviation or name. However, other names are sometimes used, usually related to a Connected Vehicle program or the like. Most of these systems are either pure DSRC or a variation of the IEEE 802.11 wireless standard. The term DSRC will be used throughout herein. However, besides the pure DSRC system it is also meant to cover dedicated wireless communication systems between cars and roadside infrastructure system, which are integrated with GPS and are based on an IEEE 802.11 protocol for wireless local area networks (such as, 802.11p, etc.).

The infotainment head unit 204 provides an interface between the vehicle 100 and a user (e.g., a driver, a passenger, etc.). The infotainment head unit 204 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a dashboard panel, a heads-up display, a center console display (e.g., a liquid crystal display ("LCD"), an organic light emitting diode ("OLED") display, a flat panel display, a solid state display, or a heads-up display), and/or speakers. When the risk index calculator 102 of FIG. 1 alerts the occupants of the risk index 112 and/or the risk category, the risk index calculator 102 uses the output devices of the infotainment head unit 204.

The on-board computing platform 206 includes a processor or controller 220, memory 222, and storage 224. In some examples, the on-board computing platform 206 is structured to include the risk index calculator 102. Alternatively, in some examples, the risk index calculator 102 may be incorporated into an ECU 210 with its own processor and memory. The processor or controller 220 may be any suitable processing device or set of processing devices such as, but not limited to: a microprocessor, a microcontroller-based platform, a suitable integrated circuit, or one or more application-specific integrated circuits (ASICs). The memory 222 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), and read-only memory. In some examples, the memory 222 includes multiple kinds of memory, particularly volatile memory and non-volatile memory. The storage 224 may include a hard drive; a solid state drive; or a physical disk such as a DVD.

The memory 222 and the storage 224 are a computer readable medium on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 222, the computer readable medium, and/or within the processor 220 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The sensors 208 may be arranged in and around the vehicles 100 and 106 in any suitable fashion. The sensors 208 may include camera(s), sonar, RADAR, LiDAR, ultrasonic sensors, optical sensors, or infrared devices configured to measure properties around the exterior of the vehicle 100. Additionally, some sensors 208 may be mounted inside the passenger compartment of the vehicles 100 and 106 or in the body of the vehicles 100 and 106 (such as, the engine compartment, the wheel wells, etc.) to measure properties in the interior of the vehicles 100 and 106. For example, such sensors 208 may include accelerometers, odometers, wheel speed sensors, cameras, microphones, and thermistors, etc.

The ECUs 210 monitor and control the systems of the vehicles 100 and 106. The ECUs 210 communicate and exchange information via the first vehicle data bus 214. Additionally, the ECU(s) 210 may communicate properties (such as, status of the ECU 210, sensor readings, control state, error and diagnostic codes, etc.) to and/or receive commands from the on-board computing platform 206. Some vehicles 100 and 106 may have seventy or more ECUs 210. In the illustrated example, the ECUs 210 include a throttle control 228, a powertrain control 230, an anti-lock brake system 232, an Advanced Driver Assistance System (ADAS) 234, an adaptive cruise control 236, an electronic stability control 238. The vehicles 100 and 106 may have different ECUs 210 than those listed. The ADAS 234 provides topology information (such as, turn angles, road gradients, road features (e.g. tunnels, bridges, etc.), etc.), and position information (e.g., coordinates from the GPS) and road information (such as, speed limits, surface material, etc.) about the roads in the vicinity of the vehicle 100. More information regarding implementation of and information provided by the ADAS 234 is available in the "ADAS Protocol for Advanced In-Vehicle Applications" (available at http://durekovic.com/publications/documents/ADASISv2%20ITS%20NY%20Paper%20Final.pdf), which is hereby incorporated by reference in its entirety. Because the forward path topology from the ADAS 234 may be included in the vehicle dynamics data 110 in the risk data 108, vehicles 100 and 106 may still benefit when one of the other nearby vehicles 106 includes the ADAS 234.

The risk index calculator 102 receives vehicle dynamics data from the sensors 208 and/or the ECUs 210 (such as, the ADAS 234, the electronic stability control 238, etc.). For example, the risk index calculator 102 may receive, via the first vehicle data bus 214, (i) the location and the direction of travel of the vehicle 100 and/or the forward path topology from the ADAS 234, and (ii) the velocity of the vehicle 100 from the wheel speed sensors. Additionally, the risk index calculator 102 may derive the road surface condition from information from the electronic stability control 238, the anti-lock brake system 232 and/or the powertrain control 230, and an estimated braking distance based of the velocity and the gross vehicle mass (GVM) of the vehicle 100. The vehicles 100 may receive weather data and/or road condition data via an external network communicatively coupled to the on-board communications platform 202. Additionally, the risk index calculator 102 may receives the distance of the nearby vehicle 106 in front of the vehicle from the ultrasonic sensors, the RADAR and/or the LiDAR. In some examples, the risk index calculator 102 may issue instructions to the ECUs 210 (such as, the throttle control 228, the powertrain control 230, the anti-lock brake system 232, the adaptive cruise control 236, etc.).

The second vehicle data bus 212 communicatively couples the on-board communications platform 202, the infotainment head unit 204, and the on-board computing platform 206. The second vehicle data bus 212 may be a Media Oriented Systems Transport (MOST) bus, an Ethernet bus, or a controller area network flexible data (CAN-FD) bus (International Standards Organization (ISO) 11898-7). The first vehicle data bus 214 communicatively couples the sensors 208, the ECUs 210, the on-board computing platform 206, and other devices connected to the first vehicle data bus 214. In the illustrated examples, the first vehicle data bus 214 is implemented in accordance with the controller area network (CAN) bus protocol as defined by International Standards Organization (ISO) 11898-1. Alternatively, in some examples, the first vehicle data bus 214 may be implemented as a MOST bus, an Ethernet bus, or a CAN-FD bus, etc. In some examples, the on-board computing platform 206 communicatively isolates the second vehicle data bus 212 and the first vehicle data bus 214 (e.g., via firewalls, message brokers, etc.). Alternatively, in some examples, the second vehicle data bus 212 and the first vehicle data bus 214 are the same data bus.

Figure 3:
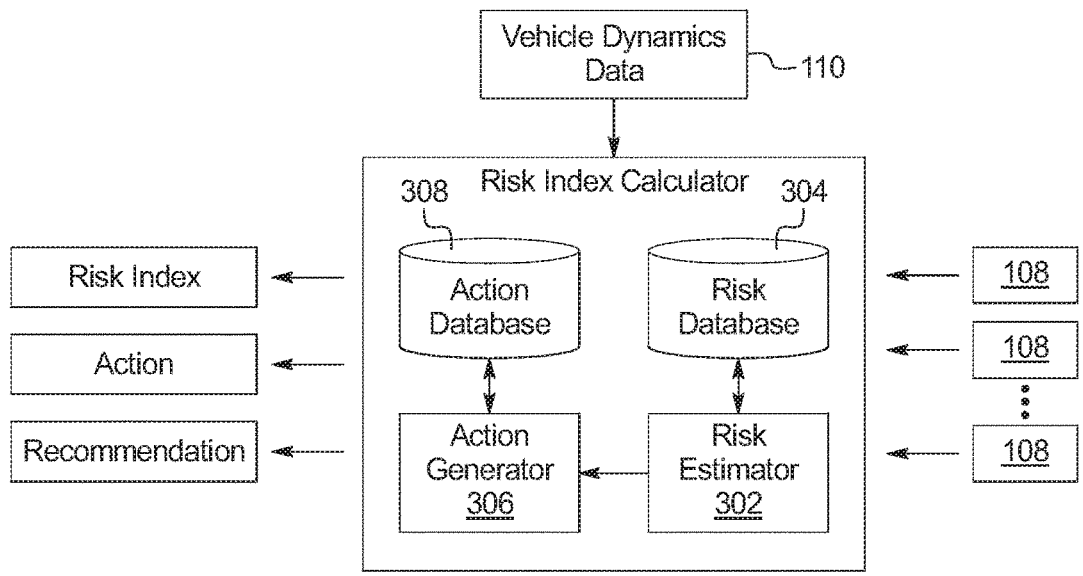
FIG. 3 illustrates a block diagram of a risk index calculator to estimate the risk indices of the vehicles of FIG. 1.

FIG. 3 illustrates a block diagram of the risk index calculator 102 to estimate the risk indices of the vehicles 100 and 106 of FIG. 1. The risk index calculator 102 uses vehicle dynamics data 110 of the vehicle of interest 100 and the risk data 108 received from the nearby vehicles 106 to estimate the risk index 112 for the vehicle of interest 100. The risk index calculator 102 also provides alerts and recommendations via the infotainment head unit 204 of FIG. 2. When the vehicle of interest 100 is autonomous or semi-autonomous, the risk index calculator 102 may request actions from ECUs 210, such as the throttle control 228, the powertrain control 230, and/or the anti-lock brake system 232. In the illustrated example, the risk index calculator 102 includes a risk estimator 302, a risk database 304, an action generator 306, and an action database 308.

Figure 4:
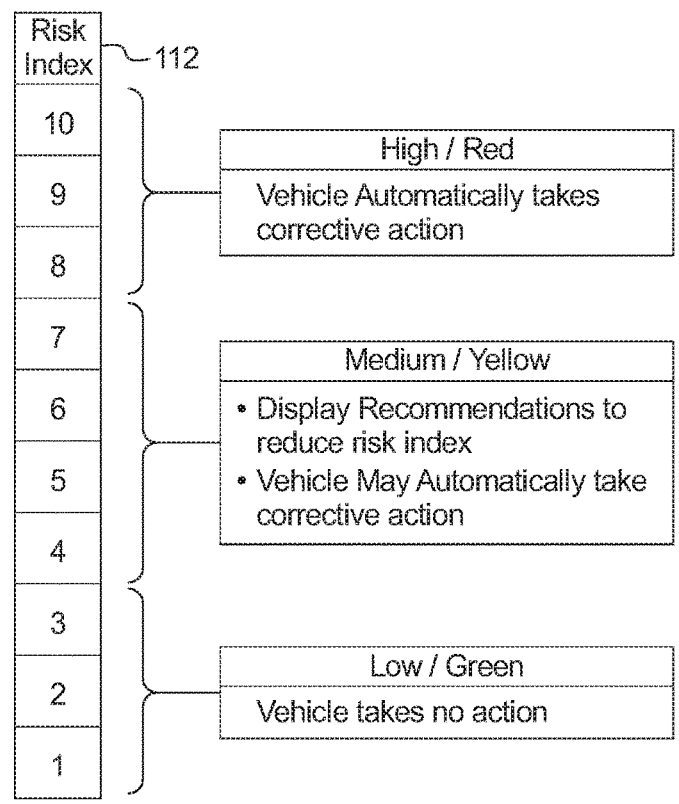
FIG. 4 depicts a chart of the risk index estimated by the risk index calculator of FIG. 3.

The risk estimator 302 estimates the risk index 112. In some examples, the risk estimator 302 assigns the vehicle of interest 100 a risk category based on the risk index 112. FIG. 4 depicts a chart of the risk index 112 and the corresponding risk categories. In the illustrated example of FIG. 4, the risk index 112 have a value between one and ten, where one is the lowest level of risk and ten is the highest level of risk. In other examples, the risk index 112 may be any suitable range of values (such as, 0 to 20, 1 to 100, etc.). In the illustrated example, the risk categories include a high risk category (risk index 112 of 8 to 10), a medium risk category (risk index 112 of 4 to 7), and a low risk category (risk index 112 of 1 to 3). In other examples, the risk categories may be graduated in any suitable manner. When one or more of the datum in the vehicle dynamics data 110 meet publicly acknowledged safe conditions, the risk index 112 is calculated low (e.g., between one and three). When one or more of the datum the vehicle dynamics data 110 meet publicly acknowledged critical conditions, the risk index 112 is calculated high (e.g., between eight and ten).

In some examples, the risk estimator 302 compares the vehicle dynamics data 110 of the vehicle of interest 100 and the risk data 108 received from the nearby vehicles 106 to risk factors stored in the risk database 304. The risk factors define conditions of the vehicle dynamics data 110 and/or combinations of that vehicle dynamics data 110 that have an elevated risk. For example, one risk factor may define that a velocity of ten miles over the speed limit has an associated risk of two. As another example, another risk factor may define that when the estimated braking distance is greater than the distance between the vehicle 100 and the nearby vehicle 106 in front, the risk is five. In such examples, if the velocity of the vehicle 100 is ten miles over the speed limit and the estimated braking distance is greater than the distance between the vehicle 100 and the nearby vehicle 106 in front, the risk index 112 may be seven.

The risk estimator 302 may also evaluate the risk index 112 and the vehicle dynamics data 110 included in the risk data 108 received from other vehicle 106. For example, a risk factor may define that when the nearby vehicle 106 in front of the vehicle 100 has a suddenly decelerates (as indicated by the change in velocity), the associated risk may be six. In some examples, the risk index 112 of the risk data 108 is added to the risk index 112 of the vehicle 100. In some examples, the risk data 108 and the risk factors identified based on the vehicle dynamics data 110 included in the risk data 108 are weighted based on the relative travel vectors of the respective vehicles 100 and 106. In some such examples, weighing factors may include proximity (e.g., closer nearby vehicles 106 have a higher weight), direction of travel (e.g., nearby vehicles 106 traveling in the same direction have a higher weight), and lane of travel (e.g., nearby vehicles 106 in the same lane have a higher weight).

The action generator 306 generates alerts, actions and/or recommendations. The alerts generated by the action generator 306 are communicated to the occupants of the vehicle 100 via the infotainment head unit 204. The alerts may be audible (such as, a voice, a chime, etc.) and/or visual (such as, a color change of the dashboard lighting, displaying the risk index 112 on the center console display, etc.). When the risk index 112 and/or the risk category satisfies (is greater or equal to) a first risk threshold (such as four), the action generator 306 generates a recommendation to reduce the risk index 112. The recommendation may be audible (such as, a voice presenting the recommendation) and/or visual (such as, displaying the recommendation on the center console display). To generate the recommendation, the action generator 306 uses the risk factors identified by the risk estimator 302 that contributed to the risk index 112 to retrieve candidate recommendations from the action database 308. For example, if the contributing risk factor is that the nearby vehicles 106 in front of the vehicle of interest 100 are quickly slowing down, the recommendation may be to reduce speed.

When the risk index 112 and/or the risk category satisfies (e.g., is greater or equal to) a second risk threshold (such as, eight) and the vehicle is autonomous or semi-autonomous, the action generator 306 generates an action (sometime referred to as a "risk reduction action") for the vehicle 100 to reduce the risk index 112. To generate the action, the action generator 306 uses the risk factors identified by the risk estimator 302 that contributed to the risk index 112 to retrieve candidate actions from the action database 308. For example, if a contributing risk factor is that the estimated braking distance is greater than the distance to the nearby vehicle 106 in front, the action generator 306 may request that the adaptive cruise control 236 increase the gap distance between the vehicle of interest 100 and the nearby vehicle 106 in front. In some examples, when the vehicle 100 is semi-autonomous, the action generator 306 generates recommendations when the risk index 112 satisfies the first risk threshold and actions when the risk index 112 the second risk threshold. In some examples, when the vehicle 100 is autonomous, action generator 306 generates the actions when the risk index 112 satisfies either the first risk threshold or the second risk threshold. In some examples, when there is more than one action or recommendation is identified by the action generator 306, the action generator 306 uses the action or the recommendation that is calculated to reduce the risk index the most.

Figure 5:
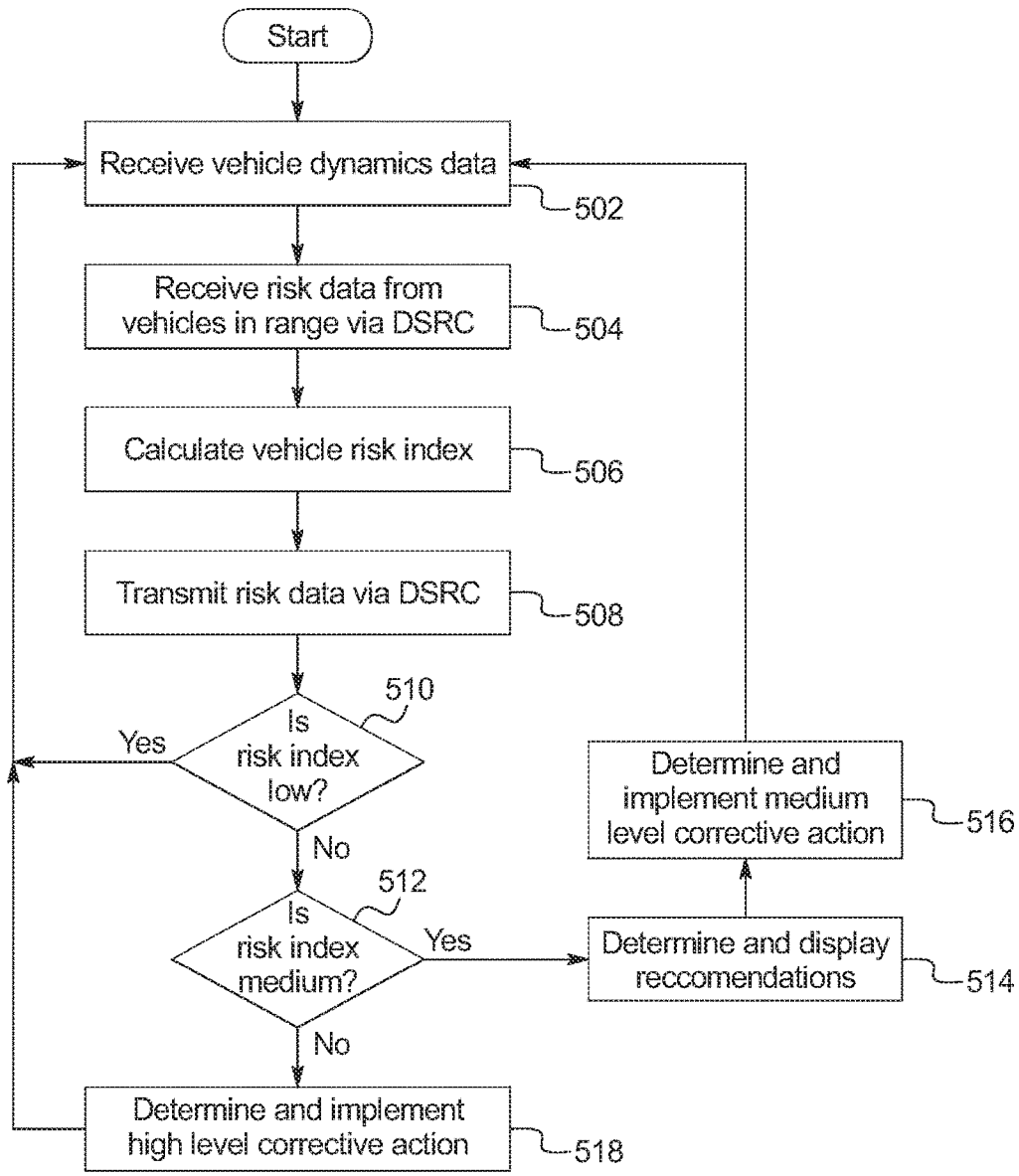
FIG. 5 is a flowchart of an example method to estimate risk indices that may be implemented by the electronic components of FIG. 2.

FIG. 5 is a flowchart of an example method to estimate risk indices that may be implemented by the electronic components 200 of FIG. 2. Initially, the risk index calculator 102 receives the vehicle dynamics data 110 (block 502). The risk index calculator 102 receives the vehicle dynamics data 110 from the sensors 208 and/or the ECUs 210 via the first vehicle data bus 214 and/or from the on-board communications platform 202 via the second vehicle data bus 212. The risk index calculator 102 receives the risk data 108 from nearby vehicles 106 within range to communicate via the DSRC module 104 (block 504). The risk index calculator 102 calculates the risk index 112 based on the vehicle dynamics data 110 and the risk data 108 from nearby vehicles 106 (block 506). The risk index calculator 102, via the DSRC module 104 transmits risk data 108 containing the vehicle dynamics data 110 collected at block 502 and the risk index 112 calculated at block 506 (block 508).

The risk index calculator 102 determines whether the risk index 112 is low (block 510). In some examples, the risk index calculator 102 compares the risk index 112 to a first risk threshold (such as, four on a scale of one to ten, etc.). The risk index 112 is low if the risk index 112 does not satisfy (e.g., is less than) the first risk threshold. If the risk index 112 is low, the risk index calculator 102 continues to obtain vehicle dynamics data (block 502). Otherwise, if the risk index 112 is not low, the risk index calculator 102 determines whether the risk index 112 is high (block 512). The risk index 112 is high if the risk index 112 satisfies (e.g., is greater than or equal to) a second risk threshold (such as, eight on a scale from one to ten, etc.). The second risk threshold is greater than the first risk threshold. If the risk index 112 is not high, the risk index calculator 102 determines recommendations and presents the recommendations to the occupants of the vehicle 100 (block 514). For example, the risk index calculator 102 may cause a voice to say, "Please increase the distance behind the proceeding vehicle." In some examples, the risk index calculator 102 causes the infotainment head unit 204 to emit an alarm at a first frequency (such as, once every thirty seconds, etc.). The risk index calculator 102 determines if any actions are to be taken to reduce the risk index 112 and sends requests to the ECUs 210 related to any determined action (block 516). The risk index calculator 102 then continues to obtain vehicle dynamics data (block 502).

If the risk index 112 is high, the risk index calculator 102 determines if any actions are to be taken to reduce the risk index 112 and sends requests to the ECUs 210 related to any determined action (block 518). Additionally, in some examples, the risk index calculator 102 communicates with one or more ECUs 210 to implement the action. If the risk index calculator 102 determines more than one candidate action, the risk index calculator 102 implements the action that reduces the risk index 112 the most. In some examples, the risk index calculator 102 causes the infotainment head unit 204 to emit an alarm at a second frequency (such as, once every ten seconds, etc.) that is more frequent than the first frequency. The risk index calculator 102 then continues to obtain vehicle dynamics data (block 502).

The flowchart of FIG. 5 is representative of machine readable instructions that comprise a program that, when executed by a processor (such as the processor 220 of FIG. 2), cause the vehicle 100 to implement the risk index calculator 102. Further, although the example program is described with reference to the flowchart illustrated in FIG. 5, many other methods of implementing the example risk index calculator 102 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a processor;
   a program stored in memory configured to:
   calculate a first risk estimation based on:
   dynamics data of the vehicle, and
   second vehicle dynamics data and a second risk estimation received from a second proximate vehicle;
   in response to the first risk estimation satisfying a risk threshold:
   determine a risk reduction action; and
   instructing a vehicle control unit to automatically implement the risk reduction action.

2. The vehicle of claim 1, wherein the program is configured to cause the vehicle to broadcast the first risk estimation based via direct short range communication.

3. The vehicle of claim 1, wherein the program is configured to cause the vehicle to obtain the first vehicle dynamics data from at least one of sensors and electronic control units of the vehicle.

4. The vehicle of claim 1, wherein the program is configured to cause the vehicle to obtain the second vehicle dynamics data and a second risk estimation from the second vehicle via direct short range communication.

5. The vehicle of claim 1, wherein the risk threshold is a second risk threshold; and wherein the program is configured to cause the vehicle to, in response to the first risk estimation satisfying a first risk threshold lower than the second threshold:
   determine a recommendation that, when implemented, reduces the first risk estimation of the vehicle; and
   present the recommendation via an infotainment head unit.

6. The vehicle of claim 5, wherein the program is configured to cause the vehicle to display the recommendation on at least one of a dashboard display, a center console display or a heads up display.

7. The vehicle of claim 1, wherein the program is configured to cause the vehicle to:
categorize the first risk estimation into one of a high risk category, a medium risk category, or a low risk category; and
present an at least one of a plurality of audio indicators or a plurality of visual indicators based on the category to which the first risk estimation is categorized.

8. A vehicle control method comprising:
calculating, via a processor of a first vehicle, a first risk estimation based on (i) first vehicle dynamics data from the first vehicle, and (ii) a second vehicle dynamics data and a second risk estimation received from a second vehicle proximate the first vehicle;
in response to the first risk estimation satisfying a risk threshold:
determining an action to reduce the first risk estimation; and
instructing the first vehicle to implement the action.

9. The vehicle control method of claim 8, including broadcasting the first risk estimation based via direct short range communication.

10. The vehicle control method of claim 8, including obtaining the first vehicle dynamics data from at least one of sensors and electronic control units of the first vehicle.

11. The vehicle control method of claim 8, including obtaining the second vehicle dynamics data and a second risk estimation from the second vehicle via direct short range communication.

12. The vehicle control method of claim 8, wherein the risk threshold is a second risk threshold; and
in response to the first risk estimation satisfying a first risk threshold lower than the second threshold:
determining a recommendation that, when implemented, reduces the first risk estimation of the first vehicle; and
presenting the recommendation via an infotainment head unit.

13. The vehicle control method of claim 12, wherein presenting the recommendation includes displaying the recommendation on at least one of a dashboard display, a center console display or a heads up display.

14. The vehicle control method of claim 8, including:
categorizing the first risk estimation into one of a high risk category, a medium risk category, or a low risk category; and
presenting an at least one of a plurality of audio indicators or a plurality of visual indicators based on the category to which the first risk estimation is categorized.

15. A computer readable medium comprising instructions that, when executed, cause a vehicle to:
calculate a first risk estimation based on (i) first vehicle dynamics data from the vehicle, and (ii) a second vehicle dynamics data and a second risk estimation received from a second vehicle proximate the vehicle;
in response to the first risk estimation satisfying a risk threshold:
determine an action to reduce the first risk estimation of the vehicle; and
automatically implement the action, via an electronic control unit, to the vehicle.

16. The computer readable medium of claim 15, wherein the instructions, when executed, cause the vehicle to broadcast the first risk estimation based via direct short range communication.

17. The computer readable medium of claim 15, wherein the instructions, when executed, cause the vehicle to obtain the second vehicle dynamics data and a second risk estimation via direct short range communication.

18. The computer readable medium of claim 15, wherein the risk threshold is a second risk threshold; and wherein the instructions, when executed, cause the vehicle to, in response to the first risk estimation satisfying a first risk threshold lower than the second threshold:
determine a recommendation that, when implemented, reduces the first risk estimation of the vehicle; and
present the recommendation.

19. The computer readable medium of claim 18, wherein to present the recommendation, the instructions, when executed, cause the vehicle to display the recommendation on at least one of a dashboard display, a center console display or a heads up display.

20. The computer readable medium of claim 15, wherein the instructions, when executed, cause the vehicle to:
categorize the first risk estimation into one of a high risk category, a medium risk category, or a low risk category; and
present an at least one of a plurality of audio indicators or a plurality of visual indicators based on the category to which the first risk estimation is categorized.

* * * * *